United States Patent [19]
Ott

[11] Patent Number: 6,023,761
[45] Date of Patent: Feb. 8, 2000

[54] METHOD AND SYSTEM FOR USING DECOMPRESSION ON COMPRESSED SOFTWARE STORED IN NON-VOLATILE MEMORY OF AN EMBEDDED COMPUTER SYSTEM TO YIELD DECOMPRESSED SOFTWARE INCLUDING INITIALIZED VARIABLES FOR A RUNTIME ENVIRONMENT

[75] Inventor: Stefan Ott, Munich, Germany

[73] Assignee: VLSI Technology, Inc., San Jose, Calif.

[21] Appl. No.: 08/915,543

[22] Filed: Aug. 13, 1997

[51] Int. Cl.[7] .................................................. G06F 9/445
[52] U.S. Cl. .............................. 713/1; 708/203; 710/68; 712/220
[58] Field of Search .................... 364/715.02; 395/561, 395/888; 708/203; 712/220; 710/68; 713/1

[56] References Cited

U.S. PATENT DOCUMENTS

| | | | |
|---|---|---|---|
| 5,530,847 | 6/1996 | Schieve et al. | 714/38 |
| 5,563,592 | 10/1996 | Cliff et al. | 341/63 |
| 5,600,766 | 2/1997 | Deckys et al. | 345/435 |
| 5,632,024 | 5/1997 | Yajima et al. | 712/205 |
| 5,673,392 | 9/1997 | Nakashima et al. | 708/203 |
| 5,696,926 | 12/1997 | Culbert et al. | 711/203 |

*Primary Examiner*—Kenneth S. Kim
*Attorney, Agent, or Firm*—Wagner, Murabito & Hao

[57] ABSTRACT

The present invention comprises a system for efficiently using non-volatile memory in an embedded system. The system of the present invention includes an embedded system having a processor, a volatile memory, and a non-volatile memory. A decompression algorithm is stored in the non-volatile memory along with a main program. When the embedded system is powered up, the decompression algorithm is executed by the processor. The decompression algorithm operates on compressed software stored in the non-volatile memory. The compressed software includes data needed to initialize the main program. After the operation of the algorithm, the decompressed software is loaded into the volatile memory, thereby initializing the main program. Since the software for initializing the main program is stored in non-volatile memory in a compressed state, and since the decompression algorithm is compact, the present invention efficiently utilizes non-volatile memory space.

26 Claims, 5 Drawing Sheets

METHOD AND SYSTEM FOR USING DECOMPRESSION ON COMPRESSED SOFTWARE STORED IN NON-VOLATILE MEMORY OF AN EMBEDDED COMPUTER SYSTEM TO YIELD DECOMPRESSED SOFTWARE INCLUDING INITIALIZED VARIABLES FOR A RUNTIME ENVIRONMENT

TECHNICAL FIELD

The present invention relates generally to embedded digital systems. More particularly, the present invention relates to a method and system for reducing the amount of read only memory required by digital embedded systems.

BACKGROUND ART

Many devices common to everyday use derive much of their utility from the manner in which they interact with users and the manner in which they implement their function. Users have become quite accustomed to intelligent machines and appliances. Such machines and appliances are often noted for their ease of use and versatility. Increasingly, a programmable digital system underlies this ease of use and functional capability. For example, consider a modern microwave oven. The microwave oven typically has numerous options for heating, defrosting and cooking, and the like. Numerous combinations of cooking time, power level, and various sensor outputs implement the many cooking routines. Microwave ovens often have sophisticated tables on a panel, where the user merely indicates what type of food is within the oven, and what action is desired (e.g., roast medium, well done, etc.) and the oven does the rest. With such a device, there is no need to be aware of power levels, cooking time, or any other such control.

An embedded digital processing system implements the above features. These systems are referred to as embedded because, unlike some other digital systems, they are not general purpose. An embedded digital processing system has a specific function with specialized software code. These systems are not usually designed to be reprogrammable. They are not usually designed to be interchangeable. Embedded digital processing systems are considered as an integral part of the device in which they are included.

Embedded digital processing systems, or simply, embedded systems, are designed to implement a specific function using specially designed software code. Within more complex devices, there may be several embedded systems, with each system implementing a specific function. In an automobile, for example, there are typically several embedded systems. Each of these systems implement a specific function and interact with the user in a specific way, as with, for example, an automatic speed control, automatic climate control, anti theft system, etc. As modern devices increase in functionality and sophistication, even the most inexpensive device or appliance will include one or more embedded systems to enhance the interface with the user or to accomplish more elaborate functions. Hence, it becomes important to reduce the cost of these embedded systems.

Figure 1:
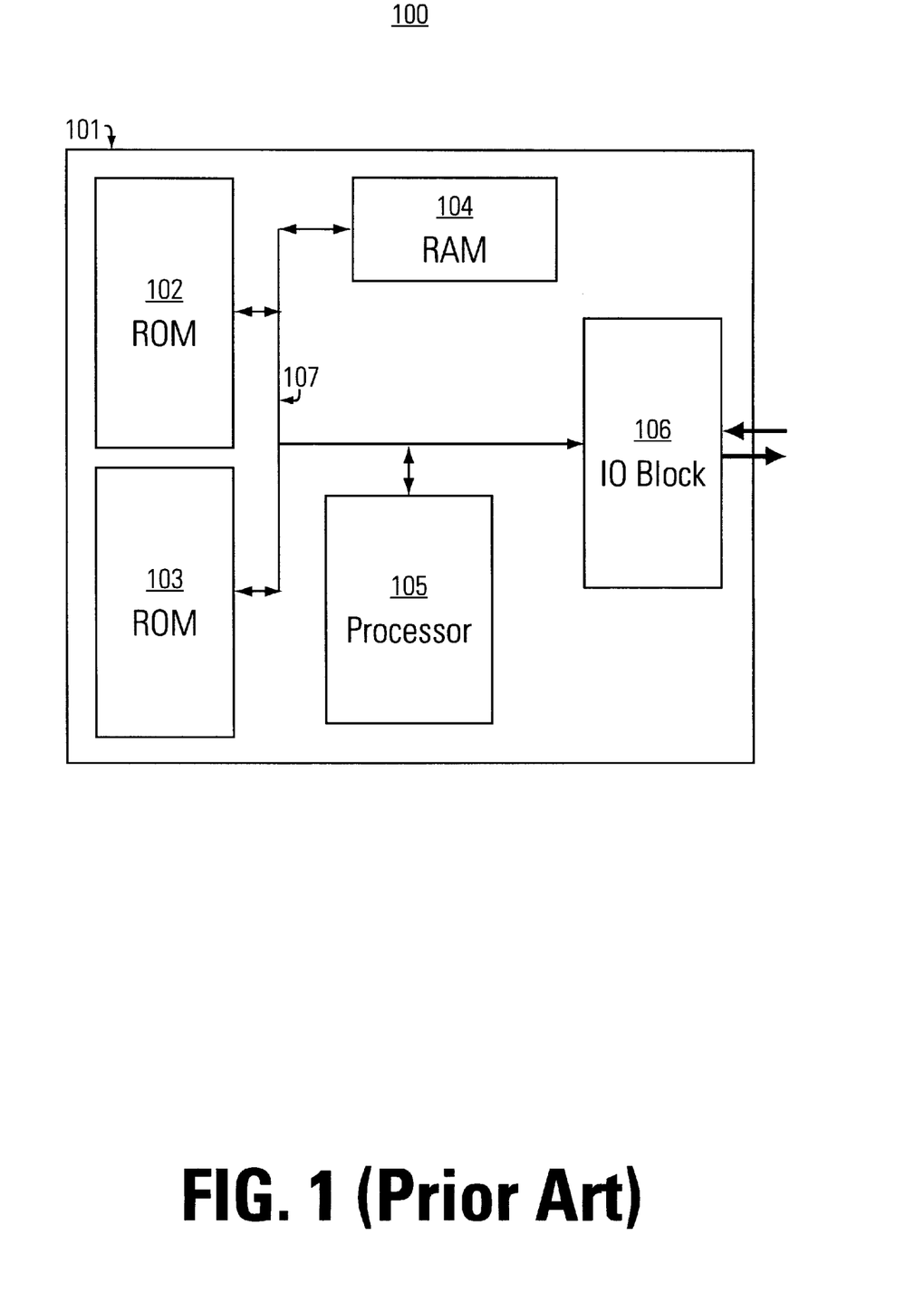
FIG. 1 shows a typical prior art embedded system.

Prior Art FIG. 1 shows a typical prior art embedded system 100. System 100 includes a read only memory (ROM) 102, a ROM 103, random access memory (RAM) 104, and an input output (IO) block 106, each coupled to a processor 105 via a bus 107. Processor 105 communicates with the external circuitry of the device through the coupled IO block 106. ROMs 102 and 103, RAM 104, processor 105, and IO block 106 are each mounted on circuit board 101.

Upon initial power up (e.g., when the device is turned on), startup software located in ROM 103 initializes the software environment of system 100. The startup software functions by setting up the software workspace for processor 105. This work space environment includes the data structures and data objects needed to execute the main program. The data structures include program constants, program variables, heaps, stacks, and the like. While many of these data structures reside in ROM 102 and ROM 103 and thus do not require a set up, certain data structures (e.g., variables, heaps, stacks, and the like) are set up in RAM 104. This is due to the fact that these areas are written to by processor 105 as it executes the main program.

Once the operating environment has been properly set up, processor 105 runs the main program code, implementing the functions as dictated. The main program code coordinates and drives the actions of system 100 in response to inputs and outputs received and sent via IO block 106. The variables, heaps, and other data structures remain in RAM 104, while the operating code runs from ROM 102 and ROM 103. The system continues to function within this environment until power off. Hence, the functionality and the features of the device containing system 100 are dictated by the functionality and features of the main program code and the software operating environment.

Figure 2:
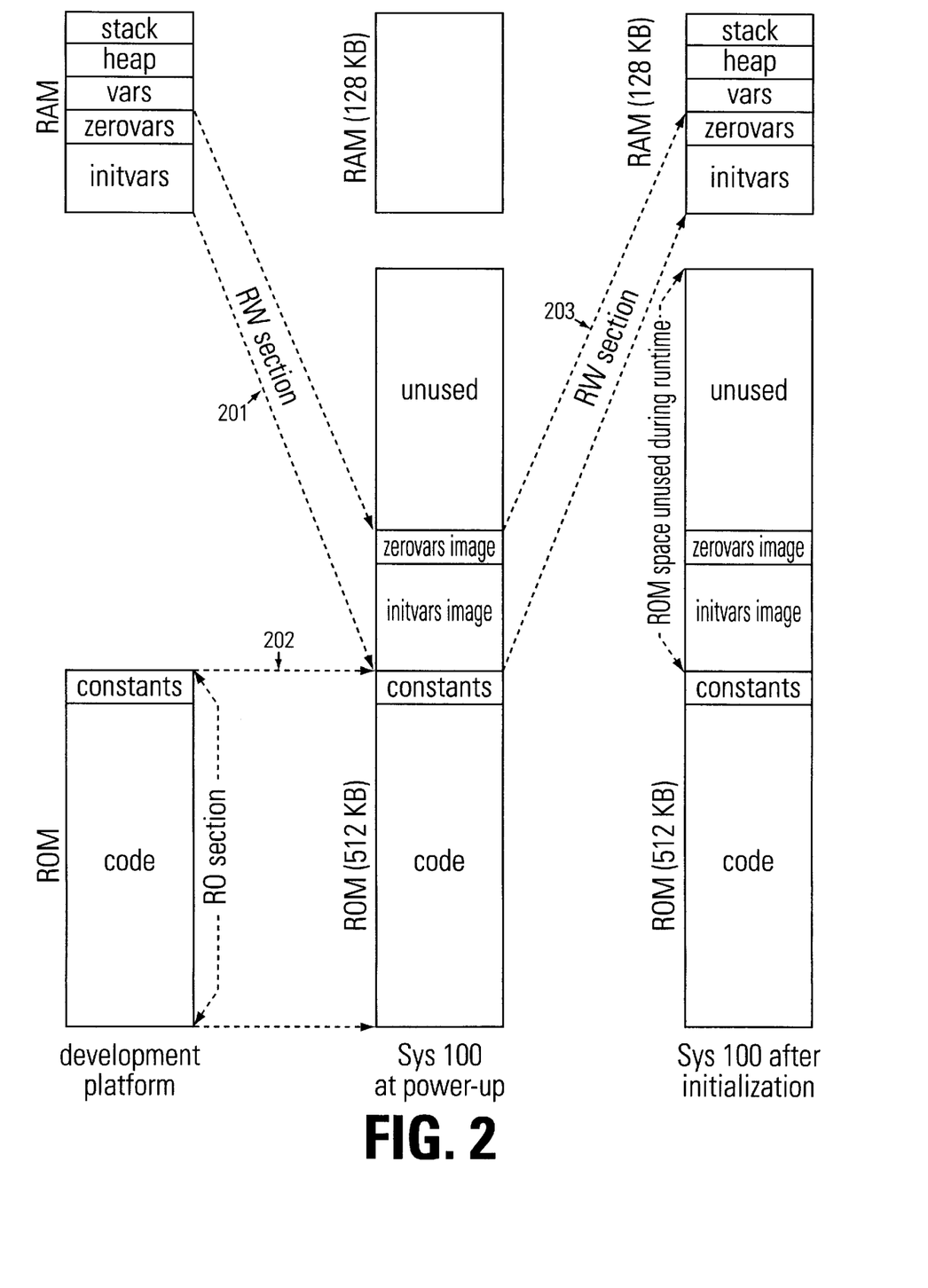
FIG. 2 shows a memory map of the software of the embedded system from FIG. 1.

Prior Art FIG. 2 shows a memory map 200 of the software of system 100. Memory map 200 diagrams the relationship between the software as designed on the development platform (e.g., a work station at a manufacturing facility), the software on system 100 at power up, and the software on system 100 after initialization. Memory map 200 portrays the software in each of the above situations in columns. The software on the development platform is the first column, the software on system 100 at power up is the second column, and the software on system 100 after initialization is the third column. In each of the columns the contents of RAM and the contents of ROM is shown. The development column shows the "intended" contents of RAM and ROM, since while in development on a workstation or other such system, the actual physical location of the software is irrelevant. The power up column shows the actual physical contents of RAM 104 and ROMs 102 and 103. ROMs 102 and 103 are both 256 KB ROMs combined through addressing into a single 512 KB address space. The after initialization column, in a similar manner, shows the contents of RAM 104 and ROMs 102 and 103.

While the software for system 100 (hereafter system software) is being developed, the intended location and intended size of the system software is carefully tracked and managed. As the development process proceeds, that portion of the system software intended to fit within RAM 104 needs to be within 128 KB (e.g., the size of RAM 104) when development and debugging is complete. This portion comprises the read write (RW) section. Likewise, that portion of system software intended to fit within ROMs 102 and 103 needs to be within 512 KB. This portion comprises the read only (RO) section of the system software. Hence, when development is complete and the device including system 100 is ready for manufacture, the finalized RAM contents and the finalized ROM contents are mapped into the 512 KB ROM address space of ROMs 102 and 103, as shown by arrows 201 and 202.

As described above, at system start up, start up software within the RO section sets up the workspace for system 100. First, the start up software copies the RW section to RAM address space. This is shown by arrows 203. The start up software copies the "image" of the zerovars and initvars to RAM address space. Zerovars are those variables which must initialize to zero. Initvars are those variables which initialize to specific non-trivial values. The zerovars and the initvars are referred to as images due to the fact that they are identical copies of their respective states in RAM address space after initialization.

After copying the zerovars and initvars images, the start up software sets up the variable workspace. The variable workspace comprises the stack, heap, and vars sections. In this manner, the start up software sets up the operating environment. Subsequently, processor 105 runs the main program code from the RO section.

There is a problem, however, in the fact that a large amount of ROM address space is used merely to store images of data which is completely unused after initialization. After the start up program copies the zerovars and initvars images to RAM address space, the large amount of ROM address space is unused during runtime. Additionally, due to the fact that RO section code and the additional zerovars and initvars images cumulatively add up to more than 256 KB, system 100 needs to include two ROMs (e.g., ROM 102 and ROM 103) as opposed to one. Even though a majority of the second ROM is space unused during runtime, its added cost and complexity must be included within system 100. Alternatively, if a single 512 KB ROM where used, the total cost of system 100 is greater than necessary, considering the ROM space unused during runtime.

Thus, what is required is a solution which eliminates wasted address space from embedded systems. The required solution should reduce the amount of ROM space required for storing runtime environment information. The required solution should utilize ROM space more efficiently, to reduce the cost of embedded systems and to provide greater functionality to main program code. The present invention provides this required solution.

DISCLOSURE OF THE INVENTION

The present invention provides a method and system which eliminates wasted address space from embedded systems. The system of the present invention reduces the amount of ROM space required for storing runtime environment information. The system of the present invention utilizes ROM space more efficiently, reducing the cost of embedded systems and allowing for greater functionality in main program code.

In one embodiment, the present invention comprises a system for efficiently using ROM space in an embedded system. The system of the present invention includes an embedded system having a processor, a RAM, and a ROM. A decompression algorithm is stored in the ROM space along with a main program. When the embedded system is powered up, the decompression algorithm is executed by the processor. The decompression algorithm operates on compressed software stored in the ROM space. The compressed software includes data needed to initialize the main program. After the operation of the algorithm, the decompressed software is loaded into the RAM space, thereby initializing the main program. Since the software for initializing the main program is stored in the ROM in a compressed state, and since the decompression algorithm is compact, the present invention efficiently utilizes ROM space.

The saved space allows a smaller, less expensive ROM to be used. Alternatively, the saved space allows for a larger, more sophisticated and feature filled main program. In this manner, the system of the present invention utilizes ROM space more efficiently, eliminating wasted address space from the embedded system.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

BEST MODE FOR CARRYING OUT THE INVENTION

Reference will now be made in detail to the preferred embodiments of the invention, data compression for embedded system ROM, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "processing" or "mapping" or "executing" or the like, refer to the action and processes of a computer system (e.g., 400 of FIG. 4), or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a method and system which eliminates wasted address space from embedded systems. The system of the present invention reduces the amount of ROM space required for storing runtime environment information. The system of the present invention utilizes ROM space more efficiently, reducing the cost of embedded systems and allowing for greater functionality in main program code. The present invention and its benefits are further described below.

Figure 3:
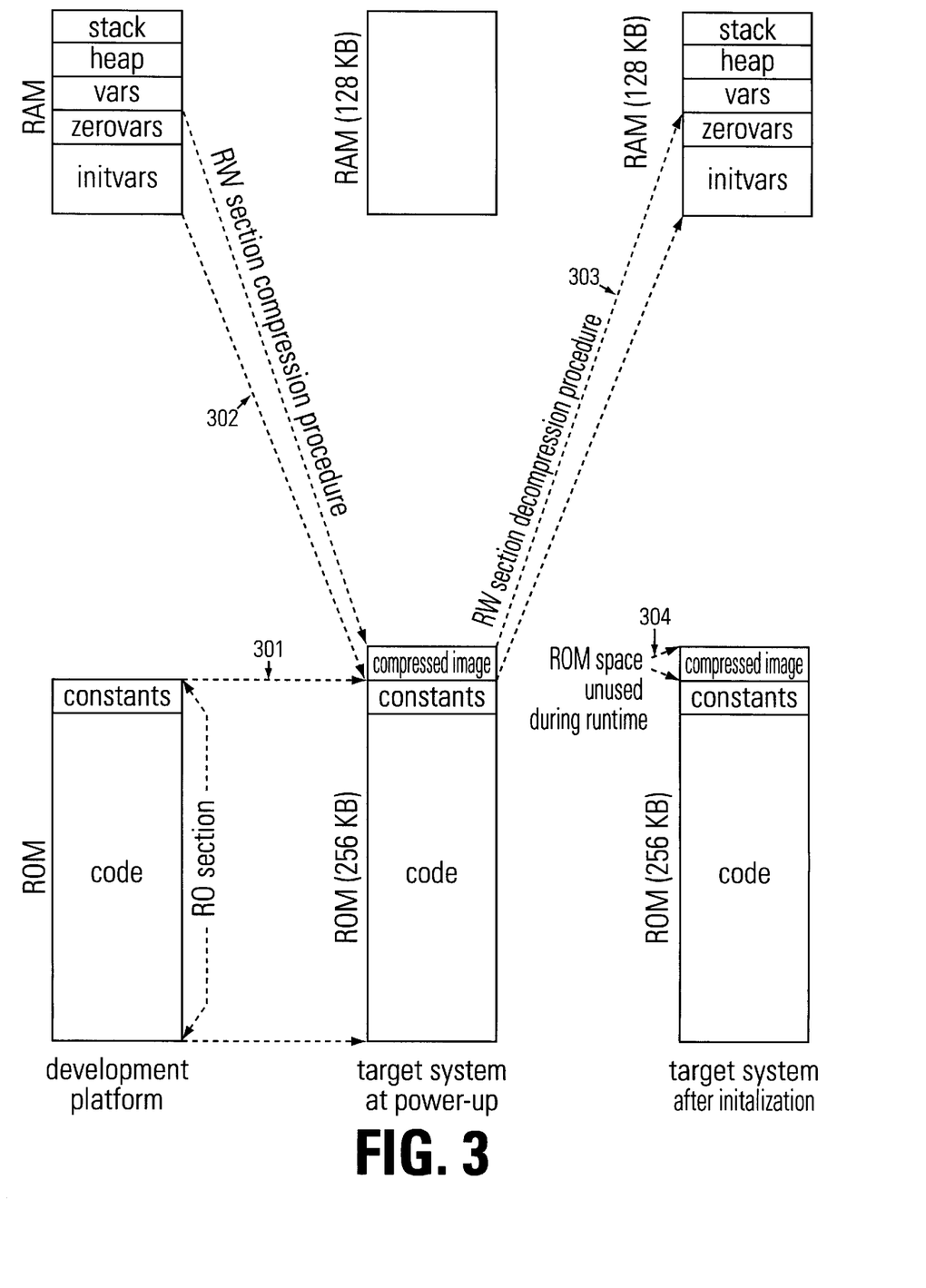
FIG. 3 shows a memory map of the software of a target system in accordance with one embodiment of the present invention.

Referring now to FIG. 3, a memory map 300 of the software of an embedded system in accordance with one embodiment of the present invention. Memory map 300 shows the software of a system in accordance with the present invention in three stages. Memory map 300 shows the relationships between portions of the software and the relationship between the three stages. Each stage is shown as a column, the first stage being the left column, the second stage being the center column, and the third stage being the right column.

The left column of memory map 300 shows the software as developed on a development platform. The development platform is the computer system used to design and write the software for the embedded system. The development platform is used to run software design tools, circuit emulation and test routines, and debugging routines as the software for the embedded system is being written. The software is carefully designed such that the finished version fits efficiently within the anticipated memory space of the embedded system. Hence, memory map 300 shows the software and its intended storage locations, ROM address space and RAM address space, in the embedded system.

Within the ROM address space, a code section and a constants section are shown. The code section includes a main program and a start up program. The main program includes the software which implements the functions and features of the embedded system. The start up program includes software which initializes the embedded system, setting up the run time environment for the main program. The constants section includes values and data objects which are nonvarying. The constants are typically items relating to the specific application the embedded system is intended to implement (e.g., a time out period for user input), or items specific to the hardware (e.g., the starting address for the main program or specific software routines). Together, the constants section and the code section comprise the read only section, or RO section.

The RAM address space includes, a stack, heap, vars, zerovars, and initvars sections. The stack and heap sections comprise software which implements data structures needed by the main program to function. The vars section includes variables which do not have to be initialized. The zerovars and initvars sections include variables which need to be initialized to zero and variables which need to be initialized to specific values, respectively.

Thus, the development platform column shows the developed software for the embedded system. The software in the RAM address space is tracked with regard to its size to ensure it will fit within a target system. Similarly, the software in the ROM address space is tracked with regard to its size to ensure it will fit within the target system.

In the center column of memory map 300, the software is shown as stored on the target system at power up. The software from the RO section is copied from the development platform into a single 256 KB ROM (hereafter ROM) of the target system. This is shown by arrows 301. As described above, the RO section includes the main program and the startup program.

In accordance with the system of the present invention, the zerovars and the initvars sections are compressed prior to being copied into the ROM. As opposed to simply copying the zerovars and initvars images into the ROM in accordance with the prior art, the present invention first compresses the zerovars and initvars sections and then stores the resulting compressed software code (hereafter compressed image) into the ROM. This is shown by arrows 302 as the RW section compression procedure. In so doing, both the RO section and the compressed image fit within the 256 KB address space of the single ROM. While a target system in accordance with the prior art would require two 256 KB ROMs to store the RO section and the zerovars and initvars images, a target system in accordance the present invention fits the RO section and the compressed image into the single ROM, thus, eliminating wasted ROM space. This reduces the cost of the target system, reducing part count, complexity and fabrication costs. Similarly, where an equivalent system in accordance with the prior art uses a single 512 KB ROM to store the RO section and the zerovars and initvars images, and while wasting a large portion of the 512 KB ROM, the system of the present invention stores the RO section and the compressed image within a single, less expensive, 256 KB ROM.

In the present embodiment, a post-linker compression algorithm on the development platform performs the compression of the zerovars and initvars images. The compression algorithm is optimized to reduce the storage space of the compressed image as much as possible. The compression algorithm has a corresponding pre runtime decompression algorithm to perform the decompression of the compressed image. This decompression algorithm comprises a portion of the start up program and is stored within the ROM.

In the right column, memory map 300 shows the software on the target system after initialization. After power up, the startup software initializes the runtime environment of the target system by setting up the stack, heap, and vars data structures. In addition, the decompression algorithm decompresses the compressed image, yielding the zerovars and initvars sections. This is shown by arrows 303 as the RW section decompression procedure. After initialization, the runtime environment of the target system is initialized. The 128 KB RAM of the target system is ready for operation with the main program.

Thus, the system of the present invention utilizes ROM address space more efficiently than the prior art. Since, the present invention stores the compressed image in ROM as opposed to the full zerovars and initvars images, only a much smaller ROM space goes unused during runtime. This is shown by arrows 304. Hence, for a given system implementation, the present invention can either fit a more complex, more feature filled main program into the same ROM address space as a prior art system, or utilize less ROM address space to store the same main program. In so doing, the present invention provides greater flexibility and freedom to designers by allowing a broader range of choices and trade off for target system capabilities and expense than possible with the prior art.

It should be noted that the present invention is suited to the use of a number of compression and decompression algorithms. In the present embodiment, for example, a post-linker run-length compression algorithm hosted on the development platform is used for compression of the zerovars and initvars images and a pre-runtime run-length decompression algorithm is utilized for decompression during initialization. Differing types of compression and decompression algorithms can be used without departing from the scope of the present invention. An exemplary compression algorithm and an exemplary decompression algorithm are discussed below.

The following is a pseudo code representation of a run-length compression and decompression algorithm pair. The algorithms treat data as a stream of bytes (e.g., characters) and function by compressing and decompressing strings of identical bytes.

Declaration of Terms Used in the Descriptions

D: Delimiter, size: 1 byte, value range: 0 . . . 255.

B: Information, size: 1 byte, value range: 0 . . . 255, but not equal to D.

L16: Extended Count, size: 2 bytes, value range: 0 . . . 65535.

L8: Short Count, least-significant 8 bits of L16, size: 1 bytes, value range: 0 . . . 255.

Z8: Zero byte, size: 1 byte, value: 0.

SRC: Source data byte sequence (input to algorithm).

TRG: Target data byte sequence (output from algorithm).

Description of Run-length Compression Algorithm

1. Read all bytes from SRC and determine the byte value that occurs least of all in the whole SRC stream and assign this value to be the delimiter D. Write D to TRG.
2. Go to the first byte of SRC.
3. Read a byte B from SRC and determine whether (and how many) the following consecutive bytes are identical to B. If there are identical bytes, determine the run length L16 (greater than 1, maximum 65535), otherwise the run length L16 is 1.
4. If L16 is less than 4: If B is not equal to D, write L16 times B to TRG, else write D, L8 to TRG.
5. If L16 is in the range 4 . . . 255, write D, L8 , B to TRG.
6. If L16 is in the range 256 . . . 65535, write D, Z8, L16 , B to TRG.
7. Continue with 3 until SRC is exhausted.
8. Write D, Z8, Z8, Z8, to TRG to signalize end of file to the decompressor.
9. Write up to 3 padding bytes to TRG so that the size of TRG becomes a multiple of 4 (required only for ARM6 decompressor).

Note: If the actual run length in SRC exceeds 65535, the algorithm will split this up into smaller pieces.

Description of Run-length Decompression Algorithm

1. Read the first byte of SRC and store this to delimiter D.
2. Read a byte B from SRC.
3. If B is not equal to D, write B to TRG, continue with step 2.
4. Read L8 from SRC.
5. If L8 equals zero, read L16 and B, else if L16 is less than 4, assign B=D, else read B from SRC.
6. If L16 equals to zero (SRC is exhausted), terminate decompression.
7. Write L16 times B to TRG, continue with step 2.

It should be noted that in a system configuration having a process in accordance with the present embodiment, the initvars and zerovars sections are compressed using a run-length encoding algorithm in accordance with the present embodiment, achieving an average compression ratio of 10:1 and saving 90 KB of ROM space within the target system. The decompression algorithm consists of 24 ARM6 instructions, thus occupying less than 100 bytes of code in the ROM of the target system. In the present embodiment, JumpStart 2.2™ was used as development kit. Better compression algorithms, like LZW™, achieve a compression ratio of 20:1, but at the expense of more than 5 KB of code in the ROM space of the target system.

Additionally, it should be noted that, in the present embodiment, the compression algorithm was run on the RW section. This can be obtained from the linker as a separate "file by request" in the linker command file. In the target system, RO and RW sections can be referenced by the tags Image$$RO$$Base, Image$$RO$$Limit, Image$$RW$$Base, and Image$$RW$$Liinit.

Figure 4:
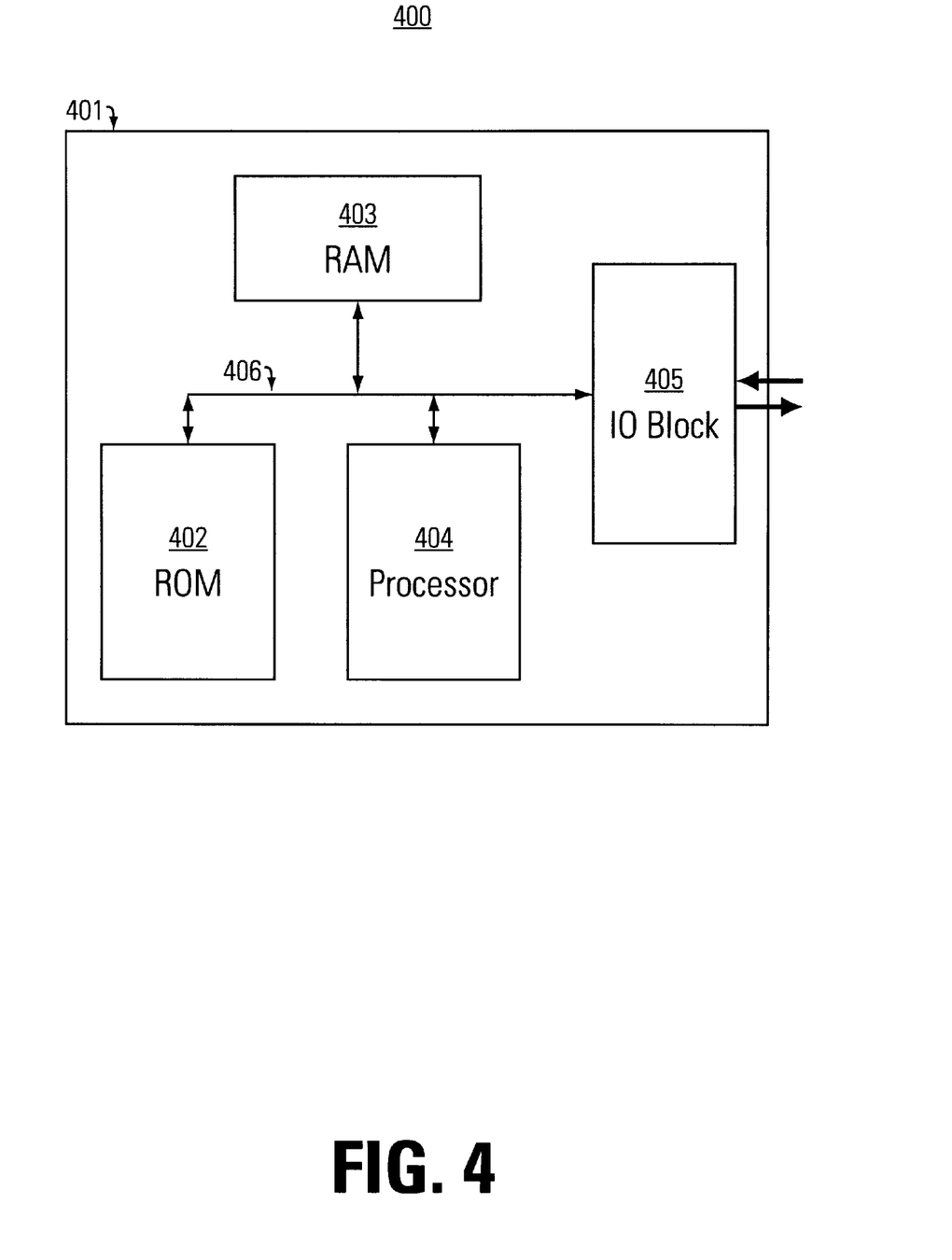
FIG. 4 shows a target system in accordance with one embodiment of the present invention.

Referring now to FIG. 4, a target system, embedded system 400, in accordance with one embodiment of the present invention is shown. System 400 includes a circuit board 401. A ROM 402, a RAM 403, a processor 404, and an IO block 405 are each mounted on circuit board 401. ROM 402 and RAM 403 and IO block 106 are each coupled to processor 404 via bus 406. ROM 402 is a 256 KB ROM integrated circuit. RAM 403 is a 128 KB RAM integrated circuit.

In accordance with memory map 300, ROM 402 contains a main program, a start up program, a constants software section, and a compressed image software section. After power on and initialization, RAM 403 contains stack, heap, and vars data structures, and a zerovars and initvars software section from the compressed image.

Hence, system 400 is an example target system in accordance with memory map 300. In accordance with the present invention, system 400 uses only one ROM (e.g., ROM 402), making efficient use of its read only, non-volatile storage. It should be appreciated, however, that system 400 is but one implementation of the system of the present invention. Those skilled in the art will recognize the fact that other implementations are possible within the scope of the present invention.

Figure 5:
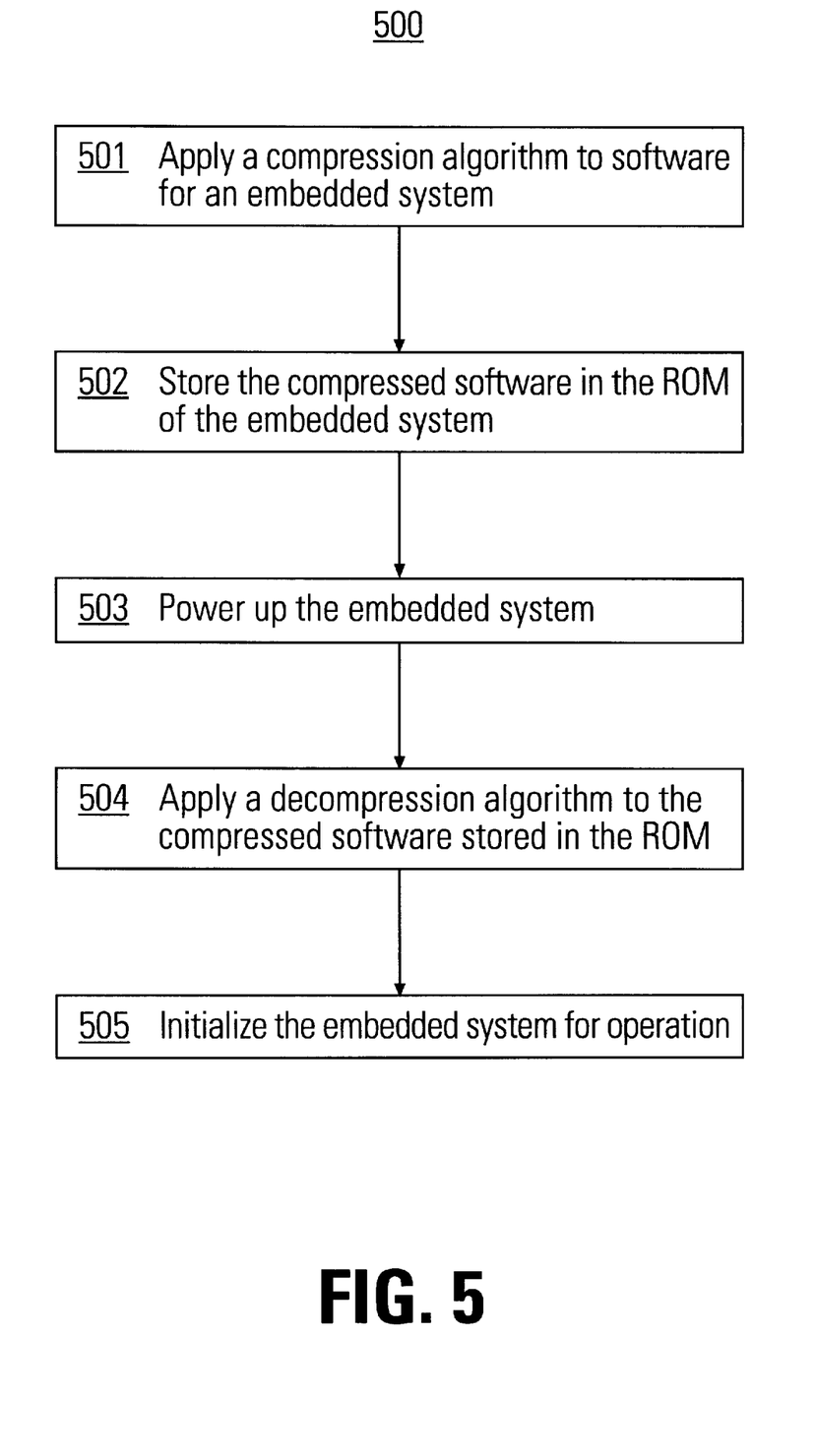
FIG. 5 shows a flow chart of the steps of a process in accordance with one embodiment of the present invention.

With reference now to FIG. 5, a flow chart of the steps of a process 500 in accordance with one embodiment of the present invention is shown. Process 500 begins in step 501, where a compression algorithm is applied to software for an embedded system in accordance with the present invention (e.g., embedded system 400). The compression algorithm and the software for the embedded system are hosted on a development platform. The development platform is typically a workstation, and is used to run software development tools for writing, testing, and debugging the software for the embedded system. The compression algorithm is applied to the portion of the software intended for use in the read and write memory of the embedded system. This memory is typically volatile (e.g., RAM 403). Hence, as described above, this software is loaded into non volatile, read only memory (e.g., ROM 402). The present invention uses the compression algorithm to reduce the amount of ROM space needed to store this software.

In step 502, process 500 stores the compressed software in the ROM of the embedded system. As described above, the software comprising the RO section (e.g., the main program, constants, and start up program) is stored in the ROM of the embedded system. All the software required to initialize and operate the embedded system is stored within the non-volatile ROM. The RAM of the embedded system, in its powered off state, is empty.

In step 503, the embedded system is powered on. For example, the device containing the embedded system is switched on, or plugged in. This energizes the circuits of the embedded system and begins the initialization process. The start up program stored in ROM is executed.

In step 504, process 500, in accordance with the present invention, applies a decompression algorithm to the compressed software stored in the ROM. As described above, the start up program includes the decompression algorithm. The decompression algorithm decompresses the compressed software stored in the ROM (e.g., the zerovars and initvars images) and loads the resulting decompressed software into the RAM. Since this software resides in ROM in a compressed state, it consumes much less space than it would in an uncompressed state. Hence, less ROM space is wasted.

In step 505, process 500 completes the initialization process for the embedded system. The stack, heap, and vars data structures are built in RAM. The RAM also now contains the zerovars and initvars sections. The operating environment for the main program is set up, and subsequently, the embedded system begins executing the main program, commencing normal operation.

Thus, the present invention provides a method and system which eliminates wasted address space from embedded systems. In addition, the system of the present invention reduces the amount of ROM space required for storing runtime environment information. The system of the present invention utilizes ROM space more efficiently, reducing the cost of embedded systems and allowing for greater functionality in main program code.

It should be appreciated that the present invention is suited to use with other types of embedded systems, in addition to those described above. These other types of embedded systems use non-volatile memory to store only a representation of the software, as opposed to storing and then running the software from the non-volatile memory. This is done for performance reasons. At system start up, the software is copied from the slow, relatively expensive, non-volatile memory to fast volatile memory and run from there. Many high performance embedded systems (e.g., LAN/WAN network hubs & routers, modems, telecom central office systems and switches, and the like) implement such a system. The aforementioned volatile memory may also be included in the processor chip itself, also for performance reasons (e.g., as is often the case with digital signal processing (DSP) tasks such as modems).

Accordingly, the major portion of the software is not run from non-volatile memory. Thus, the method and system of the present invention is utilized to compress nearly all the non-volatile memory contents, greatly reducing the required size of the non-volatile memory required. Approximately 25 instructions need to remain uncompressed (e.g., the decompression software code), however, for execution by the processor at power up. The volatile memory could be implemented by the use of fast and inexpensive dynamic random access memory (DRAM) which makes very efficient use of silicon area per bit stored. For example, one bit of DRAM is on the order of one tenth the price of one bit of FLASH EPROM and only one fifth the price of non-erasable one time programmable ROM (OTPROM).

In addition, for the most efficient implementation of this embodiment of the present invention, a rather powerful compression/decompression algorithm is required in order to achieve high compression ratios. The more powerful the compression/decompression algorithm, the more efficient the non-volatile memory utilization. However, it should be noted that with smaller embedded systems, the size of the decompression algorithm, along with other factors such as complexity and speed, increases in importance relative to the efficiency of the decompression algorithm. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An embedded system having a processor, a volatile memory, and a non-volatile memory, wherein the system implements a process for efficiently using non-volatile memory space, the process comprising the steps of:

a) powering up said embedded system;

b) running a decompression algorithm stored in said non-volatile memory coupled to said embedded system;

c) using said decompression algorithm on compressed software stored in said non-volatile memory to yield decompressed software including initialized variables for a runtime software environment of the embedded system, wherein said initialized variables include at least one variable initialized to zero and at least one variable initialized to a specific non-zero value;

d) storing said decompressed software in said volatile memory and;

e) executing a main program for said embedded system, wherein said main program is stored in said non-volatile memory and executes from said non-volatile memory, said main program linked with said initialized variables in said volatile memory.

2. The system of claim 1, wherein step b) further includes running a run-length decompression algorithm stored in said non-volatile memory coupled to said embedded system.

3. The system of claim 1, further including the step of applying a compression algorithm to software for said embedded system, yielding said compressed software.

4. The system of claim 3, further including the step of storing said compressed software in said non-volatile memory coupled to said embedded system.

5. The system of claim 3, further including the step of applying a run-length compression algorithm to software for said embedded system, yielding said compressed software.

6. The system of claim 3, further including the step of storing said compressed software in said non-volatile memory, wherein said non-volatile memory is a read only memory.

7. The system of claim 1, wherein step c) further includes the step of using a run-length decompression algorithm on said compressed software stored in said non-volatile memory to yield said decompressed software.

8. An embedded system having a processor, a volatile memory, and a non-volatile memory, wherein the system implements a process for efficiently using non-volatile memory space, the process comprising the system performing the steps of:

a) powering up an embedded system;

b) running a decompression algorithm stored in a non-volatile memory coupled to said embedded system;

c) using said decompression algorithm on compressed software stored in said non-volatile memory to yield decompressed software including initialized variables for a runtime software environment of the embedded system, wherein said initialized variables include at least one variable initialized to zero and at least one variable initialized to a specific non-zero value;

d) storing said decompressed software in a volatile memory and;

e) executing a main program for said embedded system, wherein said main program is stored in said non-volatile memory and executes from said non-volatile memory, said main program linked with said initialized variables in said volatile memory.

9. The system of claim 8, wherein step b) further includes running a run-length decompression algorithm stored in said non-volatile memory coupled to said embedded system.

10. The system of claim 9, further including the step of applying a compression algorithm to software for said embedded system, yielding said compressed software.

11. The system of claim 10, further including the step of applying a run-length compression algorithm to software for said embedded system, yielding said compressed software.

12. The system of claim 11, further including the step of storing said compressed software in said non-volatile memory coupled to said embedded system.

13. The system of claim 12, wherein step c) further includes the step of using a run-length decompression algorithm on said compressed software stored in said non-volatile memory to yield said decompressed software.

14. In an embedded system having a processor, a volatile memory, and a non-volatile memory, a process for efficiently using non-volatile memory space, the process comprising steps of:

a) powering up an embedded system;

b) running a decompression algorithm stored in a non-volatile memory coupled to said embedded system;

c) using said decompression algorithm on compressed software stored in said non-volatile memory to yield decompressed software including initialized variables for a runtime software environment of the embedded system, wherein said initialized variables include at least one variable initialized to zero and at least one variable initialized to a specific non-zero value;

d) storing said decompressed software in volatile memory and;

e) executing a main program for said embedded system, wherein said main program is stored in said non-volatile memory and executes from said non-volatile memory, said main program linked with said initialized variables in said volatile memory.

15. The system of claim 14, wherein step b) further includes running a run-length decompression algorithm stored in said non-volatile memory coupled to said embedded system.

16. The system of claim 15, wherein step c) further includes the step of using said run-length decompression algorithm on said compressed software stored in said non-volatile memory to yield said decompressed software.

17. The system of claim 14, further including the step of applying a compression algorithm to software for said embedded system, yielding said compressed software.

18. The system of claim 17, further including the step of storing said compressed software in said non-volatile memory coupled to said embedded system.

19. The system of claim 14, wherein step c) further includes the step of using said decompression algorithm on compressed software stored in said non-volatile memory to yield decompressed software, wherein said decompressed software includes code for execution by a processor.

20. The system of claim 14, wherein step c) further includes the step of using said decompression algorithm on compressed software stored in said non-volatile memory to yield decompressed software, wherein said decompressed software includes data for use by a program or process.

21. A high performance embedded system having a processor, a volatile memory, and a non-volatile memory, wherein the system implements a process for efficiently using non-volatile memory space, the process comprising the system performing the steps of:

a) powering up an embedded system;

b) running a decompression algorithm stored in a non-volatile memory coupled to said embedded system;

c) using said decompression algorithm on compressed software stored in said non-volatile memory to yield decompressed software including initialized variables for a runtime software environment of the embedded system, wherein said initialized variables include at least one variable initialized to zero and at least one variable initialized to a specific non-zero value;

d) storing said decompressed software in a volatile memory; and e) executing a main program for said embedded system, wherein said main program is stored in said non-volatile memory and executes from said non-volatile memory, said main program linked with said initialized variables in said volatile memory.

22. The system of claim 21 wherein step e) running said decompressed software from said volatile memory, said volatile memory implemented in DRAM (dynamic random access memory).

23. The system of claim 21, wherein step b) further includes running a run-length decompression algorithm stored in said non-volatile memory coupled to said embedded system.

24. The system of claim 21, further including the step of applying a compression to software for said embedded system, yielding said compressed software.

25. The system of claim 24, further including the step of applying a run-length compression algorithm to software for said embedded system, yielding said compressed software.

26. The system of claim 25, further including the step of storing said compressed software in said non-volatile memory coupled to said embedded system.

* * * * *